United States Patent
Dreixler et al.

(10) Patent No.: US 9,103,409 B2
(45) Date of Patent: Aug. 11, 2015

(54) READILY RELEASABLE WEDGE ASSEMBLY FOR HOLDING A WIRE ROPE IN A SOCKET

(71) Applicant: Columbia Steel Casting Co., Inc., Portland, OR (US)

(72) Inventors: Charles Dreixler, Canby, OR (US); Brian C. Matlock, Portland, OR (US)

(73) Assignee: Columbia Steel Casting Co., Inc., Portland, OR (US)

( * ) Notice: Subject to any disclaimer, the term of this patent is extended or adjusted under 35 U.S.C. 154(b) by 259 days.

(21) Appl. No.: 13/797,462

(22) Filed: Mar. 12, 2013

(65) Prior Publication Data
US 2014/0259541 A1    Sep. 18, 2014

(51) Int. Cl.
F16G 11/10 (2006.01)
F16G 11/14 (2006.01)
F16G 11/04 (2006.01)

(52) U.S. Cl.
CPC ............ *F16G 11/146* (2013.01); *F16G 11/048* (2013.01); *Y10T 24/3956* (2015.01); *Y10T 29/49815* (2015.01)

(58) Field of Classification Search
CPC ....... F16G 11/10; F16G 11/105; F16G 11/00; F16G 11/02; F16G 11/046; F16G 11/048; F16G 11/04; F16G 11/146; Y10T 24/3936; Y10T 24/3958; Y10T 24/3909; Y10T 24/3949; Y10T 24/3956; Y10T 29/49815; Y10T 403/4345; Y10T 403/1641

See application file for complete search history.

(56) References Cited

U.S. PATENT DOCUMENTS

| 1,248,973 | A | * | 12/1917 | Witherell ........................ 403/211 |
| 1,248,991 | A | * | 12/1917 | Barger ........................... 403/213 |
| 3,335,470 | A | | 8/1967 | Baer |
| 3,905,711 | A | * | 9/1975 | Rogers ............................ 403/16 |
| 4,561,154 | A | | 12/1985 | Briscoe et al. |
| 4,602,891 | A | | 7/1986 | McBride |
| 4,714,238 | A | | 12/1987 | Spradley et al. |
| RE32,847 | E | | 1/1989 | Briscoe et al. |
| 5,243,739 | A | | 9/1993 | Schmidt |
| 5,988,929 | A | | 11/1999 | Doan |
| 2009/0317180 | A1 | | 12/2009 | Kubo et al. |

FOREIGN PATENT DOCUMENTS

AU          9667929         5/1997
WO    WO2009/158288    12/2009

OTHER PUBLICATIONS

Xuzhou Sunshine Science & Technology Co., Ltd., http://ccne.mofcom.gov.cn/1054823/p4590399.html (printed May 8, 2013).

* cited by examiner

*Primary Examiner* — Jack W Lavinder
(74) *Attorney, Agent, or Firm* — Klarquist Sparkman, LLP

(57) ABSTRACT

A readily releasable wedge assembly for holding a wire rope in a socket comprises first and second wedge components and a release assembly. The first and second wedge components are joined together adjacent respective first ends thereof at a pin connection. The first and second wedge components have respective second ends opposite the first ends, which are spaced from the first ends in a longitudinal direction. The first and second wedge components are pivotable relative to each other about the pin connection and together define an outer periphery shaped to receive a wire rope. The release assembly is positioned between the second ends of the wedge components. The release assembly is threadedly actuatable to release the first and second wedge components from an expanded position and reconfigure the wedge assembly into a contracted position allowing the wedge assembly to be removed from a socket.

16 Claims, 5 Drawing Sheets

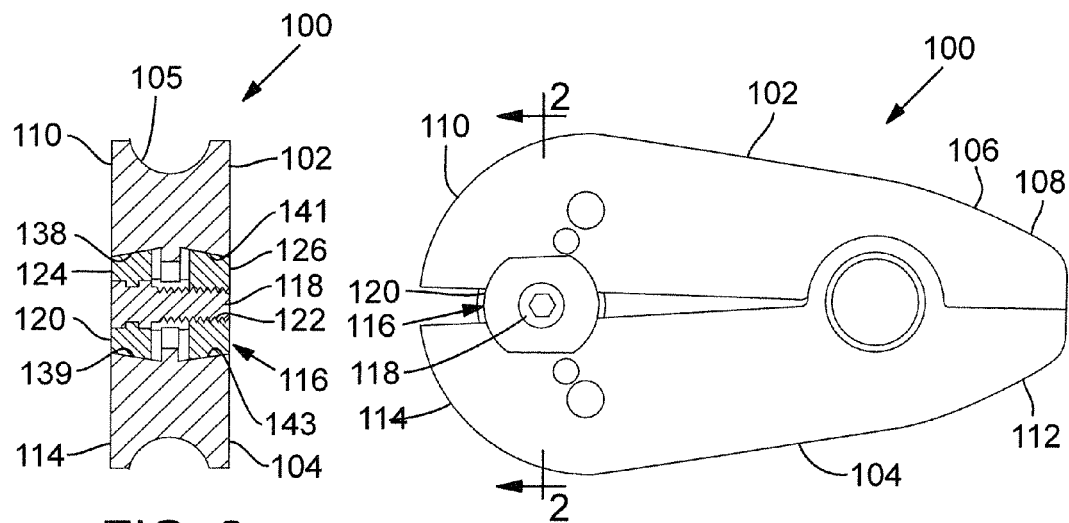
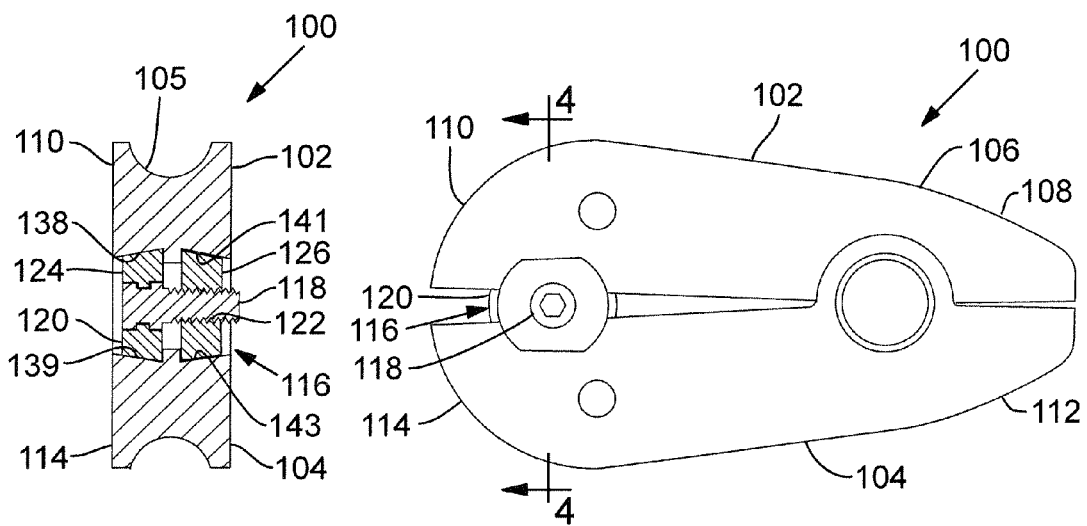

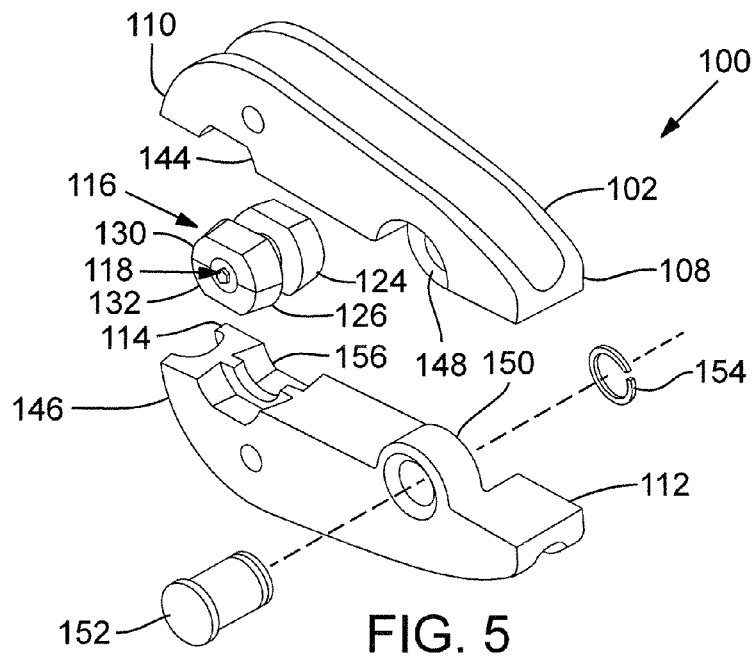
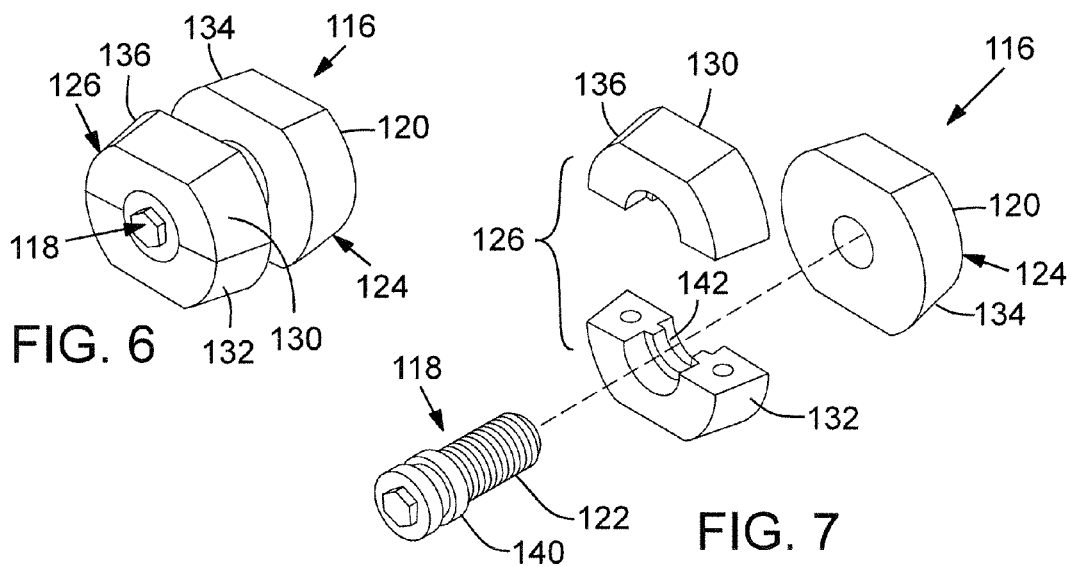

READILY RELEASABLE WEDGE ASSEMBLY FOR HOLDING A WIRE ROPE IN A SOCKET

FIELD

This application relates to securing a wire rope, and in particular to a wedge assembly for securing a wire rope within a socket.

BACKGROUND

Wedge and socket assemblies are well known. Such assemblies are used to secure an end of a wire rope, such as in dragline and other applications where heavy loads are encountered. The wedge has a generally tapered shape that fits within a tapered passage of the socket. The wire rope is inserted through a passage, looped around the wedge and then routed back through the passage. When a load is applied through the wire rope, it tends to force the wedge into the socket.

Dismantling a wedge and socket connection can be very difficult. Even after the wire rope is cut, significant effort may be required to dismantle the wedge from the socket. Such efforts result in equipment downtime and increase the risk to personnel.

SUMMARY

Described below are implementations of a releasable wedge assembly that improves upon conventional wedge assemblies.

According to one implementation, a readily releasable wedge assembly for holding a wire rope in a socket comprises first and second wedge components and a release assembly. The first and second wedge components are joined together adjacent respective first ends thereof at a pin connection. The first and second wedge components have respective second ends opposite the first ends, which are spaced from the first ends in a longitudinal direction. The first and second wedge components are pivotable relative to each other about the pin connection and together define an outer periphery shaped to receive a wire rope. The release assembly is positioned between the second ends of the wedge components. The release assembly is threadedly actuatable to release the first and second wedge components from an expanded position and reconfigure the wedge assembly into a contracted position allowing the wedge assembly to be removed from a socket.

The release assembly can comprise a rotatable member threadedly connectible to a non-rotating member. The non-rotating member can be configured to allow the second ends of the wedge components to move closer to each other as the rotatable member is rotated.

The release assembly can comprise a bolt threadedly connectible to a nut. The nut can have a beveled side surface shaped to engage with the first and second wedge members and to allow the second ends of the wedge components to pivot closer to each other as the bolt is rotated relative to the nut. The release assembly can be threadedly actuatable in a transverse direction from a side of the wedge assembly. Alternatively, the release assembly can be threadedly actuatable in a longitudinal direction from an end of the wedge assembly.

The wedge assembly can comprise a collar positioned between a head of the bolt and the nut to support the bolt. The collar can have a beveled side surface shaped to engage with the first and second wedge members. The collar can be movable in the transverse direction by rotation of the bolt. The collar can be formed in two pieces configured for assembly around the bolt. The bolt can comprise a circumferential rib, and the collar comprises a circumferential groove shaped to receive the rib and to allow the bolt to be rotated relative to the collar.

The release assembly can comprise a bolt threadedly connectible to a nut and a collar positionable along a length of the bolt between a head of the bolt and the nut. The nut and the collar can be positionable between the second ends and have angled side surfaces to engage with the first and second wedge components and to allow the second ends of the wedge components to pivot closer to each other as the bolt is rotated relative to the nut. The angled side surfaces of the nut and the collar can be oppositely oriented when the wedge assembly is assembled. The nut and the collar can be configured to move towards and away from each other as the bolt is rotated relative to the nut in a releasing direction and in an opposite expanding direction.

The first and second wedge components can have recesses shaped to receive the nut and the collar. The nut, collar and recesses can have complementary shapes to prevent the nut and collar from rotating when the bolt is rotated. The first and second wedge components can have respective first and second pin eyelet halves. The first pin eyelet half can be alignable with the second pin eyelet half to receive a pin of the pin connection when the first and second wedge components are assembled together. The release assembly can be actuatable to reconfigure the wedge from the contracted repair position to the expanded position.

According to a method implementation, readily releasing a wedge assembly for wire rope from a socket, where the assembly comprises first and second wedge components joined together at a pin connection and a release assembly positioned near an opposite end of the assembly between the wedge components, comprises threadedly actuating the release mechanism to move the first and second wedge components from an expanded position and reconfigure the wedge assembly into a contracted position. In the contracted position, the wedge assembly can be removed from a socket.

These and other implementations are described below. The foregoing features and advantages will become more apparent from the following detailed description, which proceeds with reference to the accompanying figures.

BRIEF DESCRIPTION OF THE DRAWINGS

FIG. 1 is a side elevation view of a readily releasable wedge assembly according to a first embodiment in a fully expanded position.

FIG. 2 is a section view in elevation of an end view of the wedge assembly along the line 2-2 in FIG. 1, as viewed along its longitudinal axis.

FIG. 3 is a side elevation view similar to FIG. 1, except showing the wedge assembly in a contracted position to allow its removal from a socket.

FIG. 4 is a section view in elevation of an end of the wedge assembly along the line 4-4 in FIG. 3.

FIG. 5 is an exploded perspective view of the wedge assembly of FIGS. 1-4.

FIG. 6 is an enlarged perspective view of the release assembly of FIGS. 1-5.

FIG. 7 is an exploded perspective view of the release assembly of FIG. 6.

DETAILED DESCRIPTION

Figure 8:
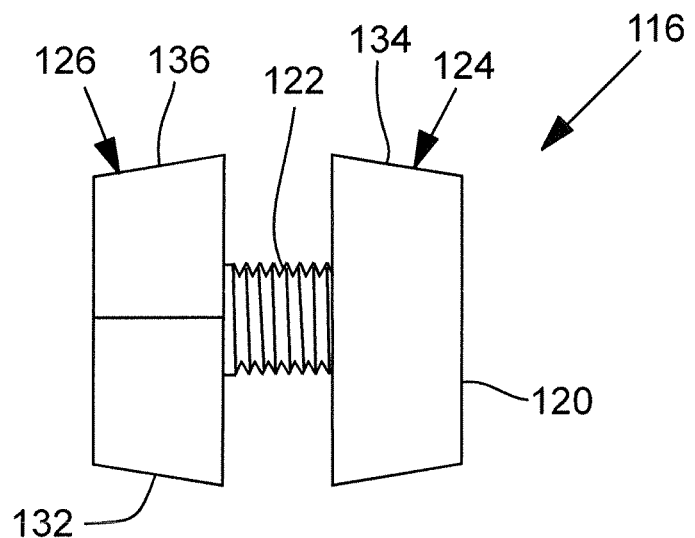
FIG. 8 is an elevation view along the longitudinal axis of the release assembly of FIG. 6 in the fully extended position.

Referring to FIGS. 1-5, one representative embodiment of the readily releasable wedge assembly, referred to as the wedge assembly 100, has first wedge half 102 coupled to a second wedge half 104 by a pin connection, such as a pin connection 106. The pin connection can be positioned adjacent a first end 108 of the wedge half 102 and a corresponding first end.

The wedge half 102 has a second end 110 opposite the first end. The wedge half 104 has a second end 114 opposite the first end 112. The wedge assembly 100 has a groove 105 defined along at least a portion of its periphery to receive and guide a wire rope (not shown). 112 of the wedge half 104.

In other embodiments, the pin connection may be a different kind of connection allowing for pivoting movement between the wedge half 102 and the wedge half 104 and/or positioned at a different location in the wedge assembly. Although the wedge assembly is described in terms of the wedge half 102 and the wedge half 104, it should be noted that the term "half" does not suggest that these components of the wedge assembly must be symmetrical in size, shape or function.

As illustrated, there is a release assembly 116 positioned between the wedge half 102 and the wedge half 104 near the second ends 110, 114. The release assembly 116 has a rotatable member 118 that is rotatable relative to a non-rotating member 120, such as by a threaded connection between these two components. By rotating the rotatable member 118 relative to the non-rotating member 120, the non-rotating member 120 is urged to move relative to the wedge halves 102, 104, in this case in the transverse direction as shown in FIG. 2, thus allowing the wedge assembly to be reconfigured from a fully extended position as shown in FIGS. 1 and 2 to a contracted position as shown in FIGS. 3 and 4. The non-rotating member 120 has a shaped periphery that interacts with corresponding surfaces on the wedge half 102 and wedge half 104 to allow these elements to move relative to each other, as is described below in more detail.

In the illustrated implementation, the rotatable member 118 is a bolt 122, and the non-rotating member 120 is a specially shaped nut 124. In addition, although not required, there is a collar 126 positioned between a head of the bolt 122 and the nut 124, and having a shape similar to the nut 124.

As best seen by comparing the section views of FIG. 2 and FIG. 4, rotation of the bolt 122 in a first direction causes the nut 124 to be drawn inwardly from the position shown in FIG. 2 to the position shown in FIG. 4 by action of the threaded connection between the bolt 122 and the nut 124. At the same time, if the illustrated collar 126 is provided, the collar 126 moves toward the nut 124 as the bolt 122 is rotated in the first direction. The inward movement in the transverse direction of the nut 124 occurs because the nut has a shaped or angled side surface 134 that slides relative to a corresponding surface 138 of the wedge half 102 and a corresponding surface 139 of the wedge half 104. Such corresponding surfaces may be angled, curved or otherwise profiled so as to provide for the desired movement in the wedge assembly 100. Similarly, the collar 126 has an angled side surface 136 that interacts with corresponding surfaces 141, 143 of the wedge half 102 and the wedge half 104, respectively. As best shown in FIG. 5, each wedge half can have a stop, e.g., a rib 156, to prevent rotation of the bolt and nut beyond a desired position.

Figure 9:
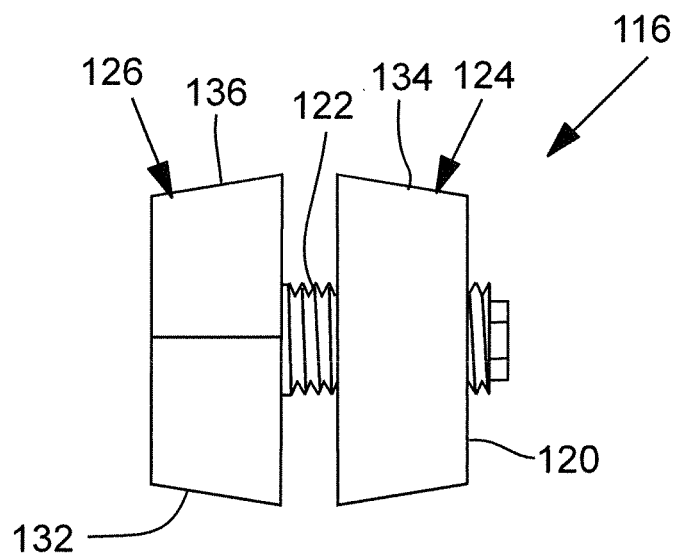
FIG. 9 is an elevation view similar to FIG. 8, except showing the release assembly configured in the contracted position.
Figure 10:
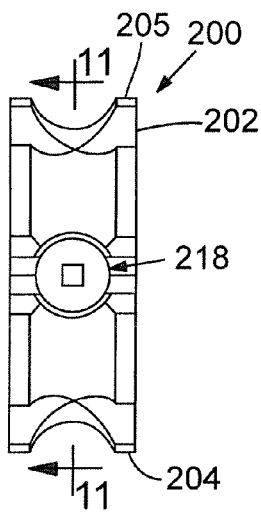
FIG. 10 is an end elevation view of a wedge assembly according to a second embodiment.

Referring to FIGS. 6 and 7, enlarged views of the release assembly 116 are shown. As indicated, the collar 126 can be provided in two or more pieces, e.g., a collar half 130 and a collar half 132, which can be secured together by suitable fasteners. The bolt 122 can have a circumferential rib 140 positioned between its threaded section and its head, as best shown in FIG. 7. The collar 126 can be provided with a complementary feature, such as a circumferential groove 142, to couple the bolt 122 and collar 126 together. FIG. 8 shows the nut 124 spaced away from the collar 126 at its greatest extent, i.e., when the wedge assembly 100 is in its fully expanded position as shown in FIG. 1. In FIG. 9, the nut 124 and the collar 126 have been moved toward each other in the transverse direction to their innermost extents, i.e., to configure the wedge assembly 100 in its contracted position as shown in FIG. 3. When the wedge assembly is in its contracted position, it is possible to remove it from the socket (not shown).

As illustrated, the nut 124 and the collar 126 are preferably shaped to prevent unintended rotation. In particular, the nut 124 and the collar 126 have flat portions along their peripheries that are accommodated in complementary recesses 144, 146 of the wedge half 102 and wedge half 104, respectively. As best seen in FIG. 5, the wedge half 102 can be formed with an eyelet half 148, and the wedge half 104 can be formed with an eyelet half 150 that can be aligned to receive a pin 152 to form the pin connection 106. The pin can be secured in place with a snap ring 154.

According to a second implementation as shown in FIGS. 10-14, a wedge assembly 200 can be fitted with a release assembly 216 that is threadedly actuated in a longitudinal direction rather than a transverse direction to allow a wedge half 202 to be moved closer to a wedge half 204 through rotation of a rotatable member 218 relative to a non-rotating member 220. The implementation of FIGS. 10-14 shares many of the same features as are described above, and thus corresponding elements have been described with the same reference number plus 100, where appropriate.

Figure 11:
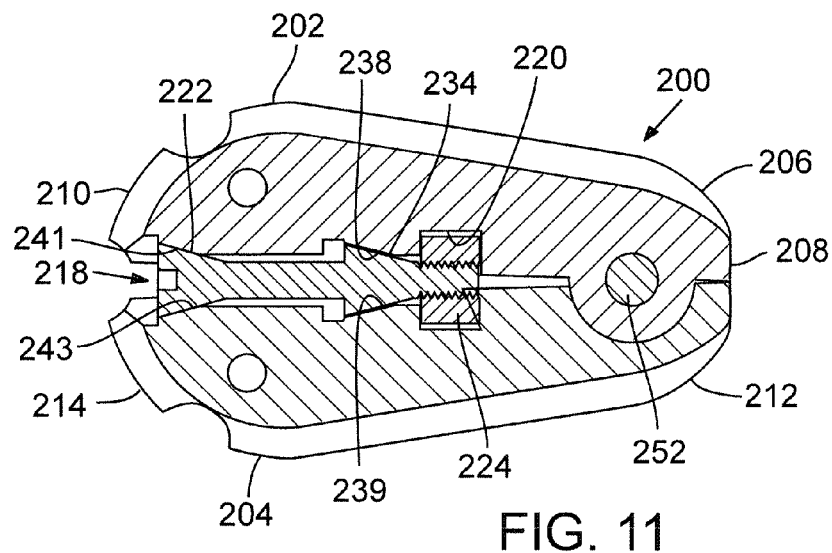
FIG. 11 is a side section view in elevation taken along the line 11-11 in FIG. 10, showing the wedge assembly in the expanded position.
Figure 12:
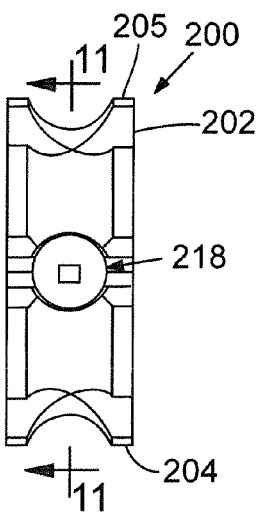
FIG. 12 is an end elevation view similar to FIG. 10, except showing the wedge assembly in the contracted position.
Figure 13:
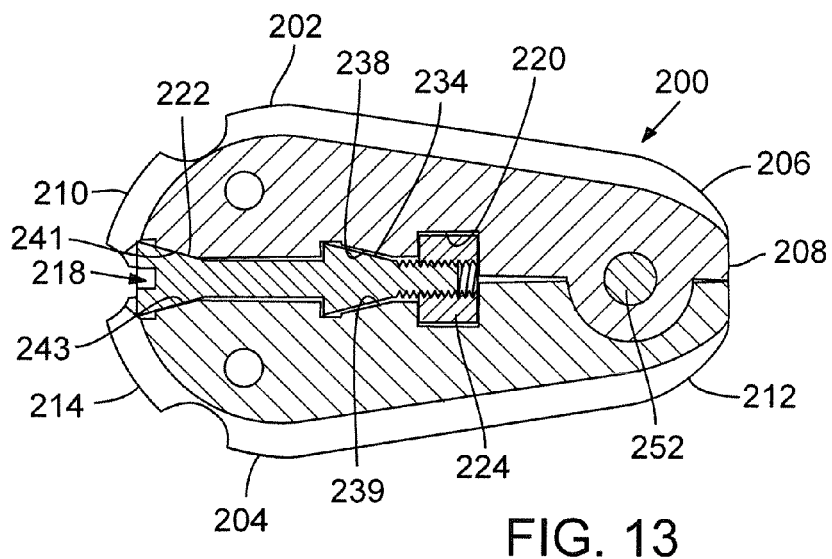
FIG. 13 is a side section view in elevation similar to FIG. 11, except showing the wedge assembly in the contracted position.

As best shown in comparing the section views of FIG. 11 and FIG. 13, the rotatable member 118 can be a specially shaped bolt 222 having at least one of a forward angled surface 234 and a rearward angled surface 236, such as adjacent a head of the bolt. A threaded section of the bolt is threadedly engageable with a nut 224 which in the illustrated implementation is stationary. As the bolt 222 is rotated, the angled side surface 234 contacts the corresponding side surfaces 238, 239 of the wedge half 102 and the wedge half 104, respectively. At the same time, the angled side surface 236 contacts the corresponding surfaces 241, 243 of the wedge half 102 and the wedge half 104, respectively. Thus, as the bolt 222 is rotated in a first direction, the wedge half 202 and the wedge half 204 are allowed to pivot closer together as the wedge assembly 200 is reconfigured from its fully expended position as shown in FIG. 11 to its contracted position as shown in FIG. 13.

Figure 14:
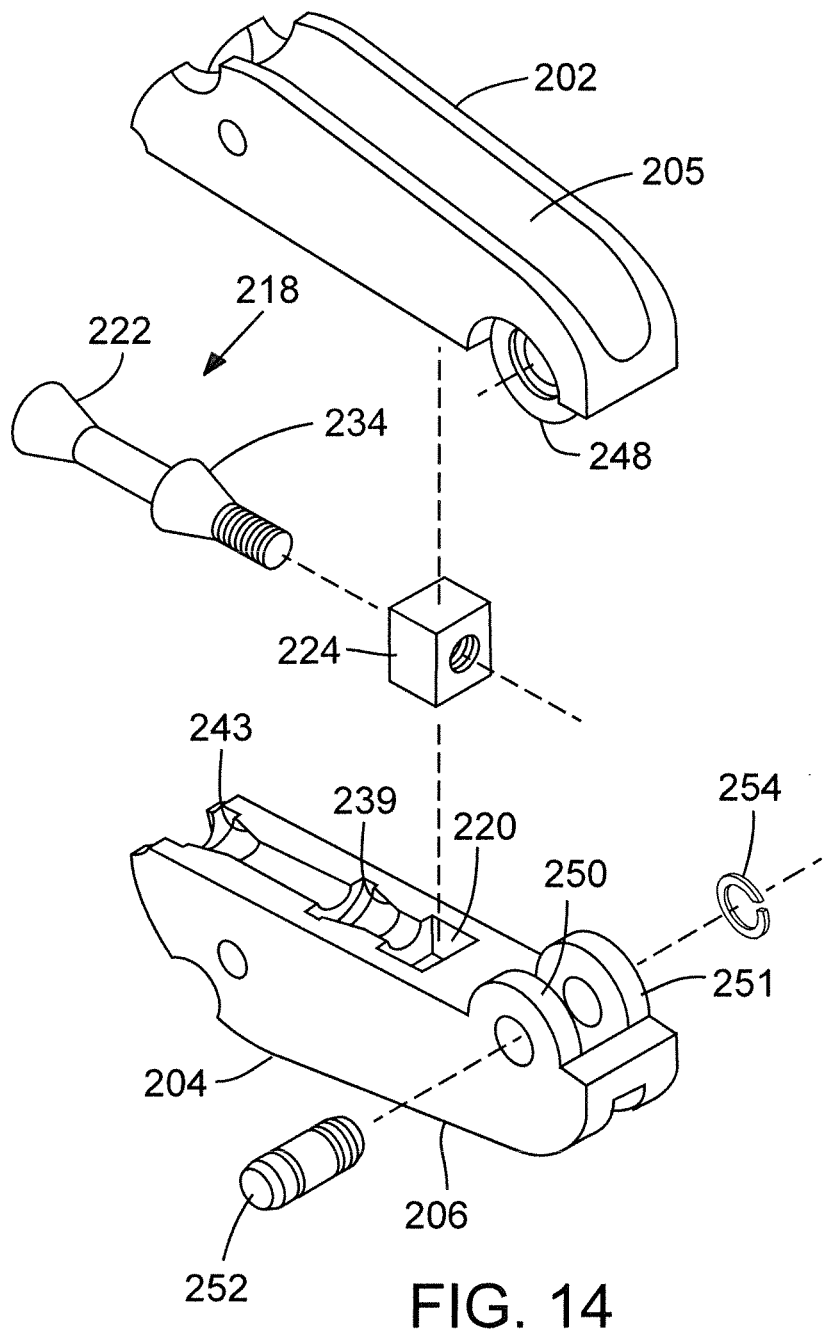
FIG. 14 is an exploded perspective view of the wedge assembly of FIGS. 10-13.

As shown in FIG. 14, the wedge half 204 has first and second outer eyelet portions 250, 251, respectively. The wedge half 202 has a center eyelet portion 248 alignable between the eyelet portions 250, 251 such that a pin 252 can be received therein to form the pin connection 206. The pin is secured with one or more snap rings 254.

The wedge portions can be formed of any suitable material, such as a high strength steel alloy, depending on the particular operating conditions. Other components are formed of suitable metals and/or other compatible materials.

In view of the many possible embodiments to which the disclosed principles may be applied, it should be recognized that the illustrated embodiments are only preferred examples and should not be taken as limiting in scope. Rather, the scope of protection is defined by the following claims. We therefore claim all that comes within the scope and spirit of these claims.

We claim:

1. A readily releasable wedge assembly for holding a wire rope in a socket, the wedge assembly comprising:
   first and second wedge components joined together adjacent respective first ends thereof at a pin connection, the first and second wedge components having respective second ends opposite the first ends and spaced from the first ends in a longitudinal direction, the first and second wedge components being pivotable relative to each other about the pin connection and together defining an outer periphery shaped to receive a wire rope; and
   a release assembly between the second ends of the wedge components, the release assembly being threadedly actuatable to release the first and second wedge components from an expanded position and reconfigure the wedge assembly into a contracted position allowing the wedge assembly to be removed from a socket.

2. The wedge assembly of claim 1, wherein the release assembly comprises a rotatable member threadedly connectible to a non-rotating member, wherein the non-rotating member is configured to allow the second ends of the wedge components to move closer to each other as the rotatable member is rotated.

3. The wedge assembly of claim 1, wherein the release assembly comprises a bolt threadedly connectible to a nut, and wherein the nut has a beveled side surface shaped to engage with the first and second wedge members and to allow the second ends of the wedge components to pivot closer to each other as the bolt is rotated relative to the nut.

4. The wedge assembly of claim 1, wherein the release assembly is threadedly actuatable in a transverse direction from a side of the wedge assembly.

5. The wedge assembly of claim 1, wherein the release assembly is threadedly actuatable in a longitudinal direction from an end of the wedge assembly.

6. The wedge assembly of claim 3, further comprising a collar positionable between a head of the bolt and the nut to support the bolt, wherein the collar has a beveled side surface shaped to engage with the first and second wedge components and the collar is movable in the transverse direction through rotation of the bolt.

7. The wedge assembly of claim 6, wherein the collar is formed in two pieces configured for assembly around the bolt.

8. The wedge assembly of claim 7, wherein the bolt comprises a circumferential rib and the collar comprises a circumferential groove shaped to receive the rib and to allow the bolt to be rotated relative to the collar.

9. The wedge assembly of claim 1, wherein the release assembly comprises a bolt threadedly connectible to a nut and a collar positionable along a length of the bolt between a head of the bolt and the nut, the nut and the collar being positionable between the second ends and having angled side surfaces to engage with the first and second wedge components and to allow the second ends of the wedge components to pivot closer to each other as the bolt is rotated relative to the nut.

10. The wedge assembly of claim 9, wherein the angled side surfaces of the nut and the collar are oppositely oriented when the wedge assembly is assembled.

11. The wedge assembly of claim 9, wherein the nut and the collar are configured to move towards and away from each other as the bolt is rotated relative to the nut in a releasing direction and in an opposite expanding direction.

12. The wedge assembly of claim 9, wherein the bolt comprises a circumferential rib and the collar comprises a circumferential groove shaped to receive the rib and to allow the bolt to be rotated relative to the collar, wherein engagement between the rib and the groove as the bolt is rotated urges the collar to move in the transverse direction relative to the first and second wedge members.

13. The wedge assembly of claim 9, wherein the first and second wedge components have recesses shaped to receive the nut and the collar, and wherein the nut, collar and recesses have complementary shapes to prevent the nut and collar from rotating when the bolt is rotated.

14. The wedge assembly of claim 9, wherein the first and second wedge components have respective first and second pin eyelet halves, wherein the first pin eyelet half is alignable with the second pin eyelet half to receive a pin of the pin connection when the first and second wedge components are assembled together.

15. The wedge assembly of claim 1, wherein the release assembly is actuatable to reconfigure the wedge from the contracted position to the expanded position.

16. The wedge assembly of claim 1, wherein the release assembly comprises a bolt threadedly connectible to a nut, and wherein the nut has a beveled side surface shaped to engage with the first and second wedge members and to urge the second ends of the wedge components to pivot away from each other as the bolt is rotated relative to the nut.

* * * * *